(12) United States Patent
Hughes et al.

(10) Patent No.: US 9,667,540 B2
(45) Date of Patent: May 30, 2017

(54) FIBER CHANNEL OVER ETHERNET (FCOE) FRAME FORWARDING SYSTEM

(71) Applicant: Dell Products L.P., Round Rock, TX (US)

(72) Inventors: Kevin Allen Hughes, Cedar Park, TX (US); Jason Garth Pearce, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 67 days.

(21) Appl. No.: 14/860,354

(22) Filed: Sep. 21, 2015

(65) Prior Publication Data

US 2017/0085474 A1 Mar. 23, 2017

(51) Int. Cl.
H04L 12/721 (2013.01)
H04L 12/741 (2013.01)

(52) U.S. Cl.
CPC .............. H04L 45/72 (2013.01); H04L 45/66 (2013.01); H04L 45/745 (2013.01)

(58) Field of Classification Search
CPC ........ H04L 45/72; H04L 45/66; H04L 45/745
See application file for complete search history.

(56) References Cited

U.S. PATENT DOCUMENTS

| 8,976,794 | B2* | 3/2015 | Xiong | .................. H04L 45/745 370/392 |
|---|---|---|---|---|
| 2011/0222538 | A1 | 9/2011 | Singh et al. | |
| 2013/0148663 | A1 | 6/2013 | Xiong | |
| 2014/0269745 | A1 | 9/2014 | Johnson et al. | |
| 2016/0248599 | A1* | 8/2016 | Berman | .............. H04L 12/4625 |
| 2016/0323204 | A1* | 11/2016 | DeSanti | ................ H04L 49/357 |

OTHER PUBLICATIONS

"FCoE End-To-End Forwarding," pp. 1-3, http://www.brocade.com/downloads/documents/html_product_manuals/NOS_410_AG/GUID-F951A7C8-38EA-481D-8489-B62E61AC8F97.html.
Gary Lee, "Ethernet Fabric Requirements for FCoE in the Data Center," Ethernet Technology Summit, Feb. 2010, pp. 1-14 http://www.bswd.com/ETS10-Lee.pdf.

* cited by examiner

*Primary Examiner* — Duc C Ho
(74) *Attorney, Agent, or Firm* — Haynes and Boone, LLP

(57) ABSTRACT

An FCoE forwarding system includes a non-FCoE-enabled networking device coupled between a source device and an FC device and including a plurality of L3 forwarding tables. The non-FCoE-enabled networking device receives a first communication from the source device and determines that the first communication includes a first FCoE frame. The non-FCoE-enabled networking device then retrieves first data from a first standard IP frame location in the first FCoE frame, second data from a second standard IP frame location in the first FCoE frame, and third data from a third standard IP frame location in the first FCoE frame, and uses the first data to reference a first L3 forwarding table of the plurality of L3 forwarding tables. The first non-FCoE-enabled networking device then uses the first L3 forwarding table with the second data and the third data to forward the first FCoE frame on to the FC device.

20 Claims, 9 Drawing Sheets

400

VFRD TABLE 0

VFRD TABLE 1

VFRD TABLE 242

FIG. 4

FIBER CHANNEL OVER ETHERNET (FCOE) FRAME FORWARDING SYSTEM

BACKGROUND

The present disclosure relates generally to information handling systems, and more particularly to an information handling system that forwards Fibre Channel over Ethernet (FCoE) frames using layer 3 (L3) forwarding tables.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some IHSs including, for example, switches, routers, and/or other network IHSs, utilize FCoE technology that involves the encapsulation of Fibre Channel frames over Ethernet networks as described in International Committee for Information Technology Standards T11 FC-BB-5 standard published in 2009, which allows the use of Fibre Channel in networks such as, for example, 10 Gigabit Ethernet networks, while preserving the Fibre Channel protocol. However, conventional FCoE switching systems include FCoE-enabled switch chips which are relatively expensive, resulting in a relatively high cost associated with transmitting FCoE communications. Non-FCoE-enabled switching systems include non-FCoE-enabled switch chips that are relatively lower cost compared to the FCoE enabled switch chips, but face a number of issues with regard to their use in transmitting FCoE communications. For example, number of user-defined forwarding or routing table entries available for use by non-FCoE-enabled switch chips in non-FCoE-enabled switching systems is limited, which limits the number of forwarding entries available for transmitting FCoE communications. As such, the size of the FCoE network fabric is limited when using non-FCoE-enabled switching systems to the point where non-FCoE-enabled switching systems are not practical for use in transmitting FCoE communications.

Accordingly, it would be desirable to provide a non-FCoE-enabled switching system for use in transmitting FCoE communications.

SUMMARY

According to one embodiment, an information handling system (IHS), includes a communication system; a storage system that includes a database; a non-FCoE-enabled processing system that is coupled to the communication system and the storage system; and a memory system that is coupled to the non-FCoE-enabled processing system and that includes instructions that, when executed by the non-FCoE-enabled processing system, cause the non-FCoE-enabled processing system to provide a Fibre Channel over Ethernet (FCoE) forwarding engine that is configured to: receive a first communication through the communication system; determine that the first communication includes a first FCoE frame; retrieve first data from a first standard IP frame location in the first FCoE frame, second data from a second standard IP frame location in the first FCoE frame, and third data from a third standard IP frame location in the first FCoE frame; use the first data retrieved from the first FCoE frame to reference a first L3 forwarding table in the database; and use the first L3 forwarding table with the second data and the third data retrieved from the first FCoE frame to forward the first FCoE frame through the communication system.

BRIEF DESCRIPTION OF THE DRAWINGS

FIG. 4 is a schematic view illustrating an embodiment of a plurality of plurality of Virtual Fabric Routing Domains (VFRDs) that may be provided as layer 3 (L3) forwarding tables.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
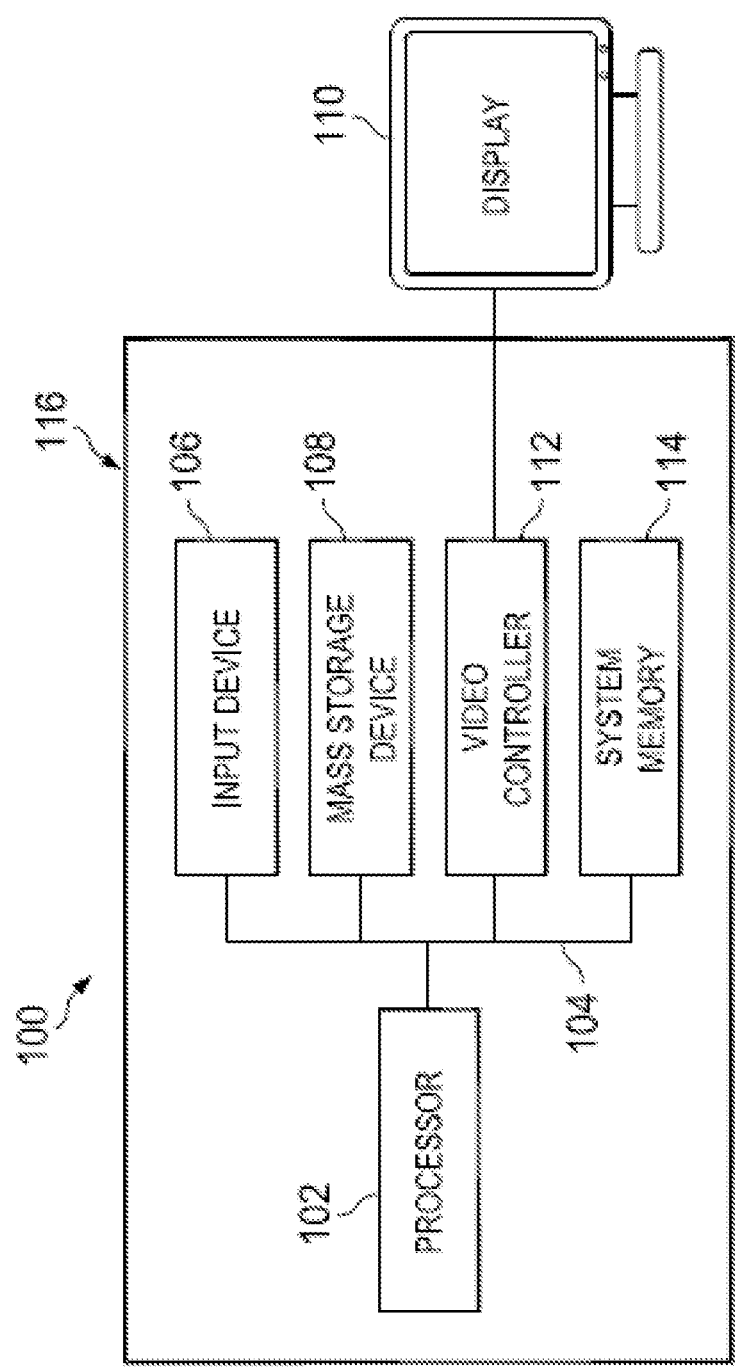
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
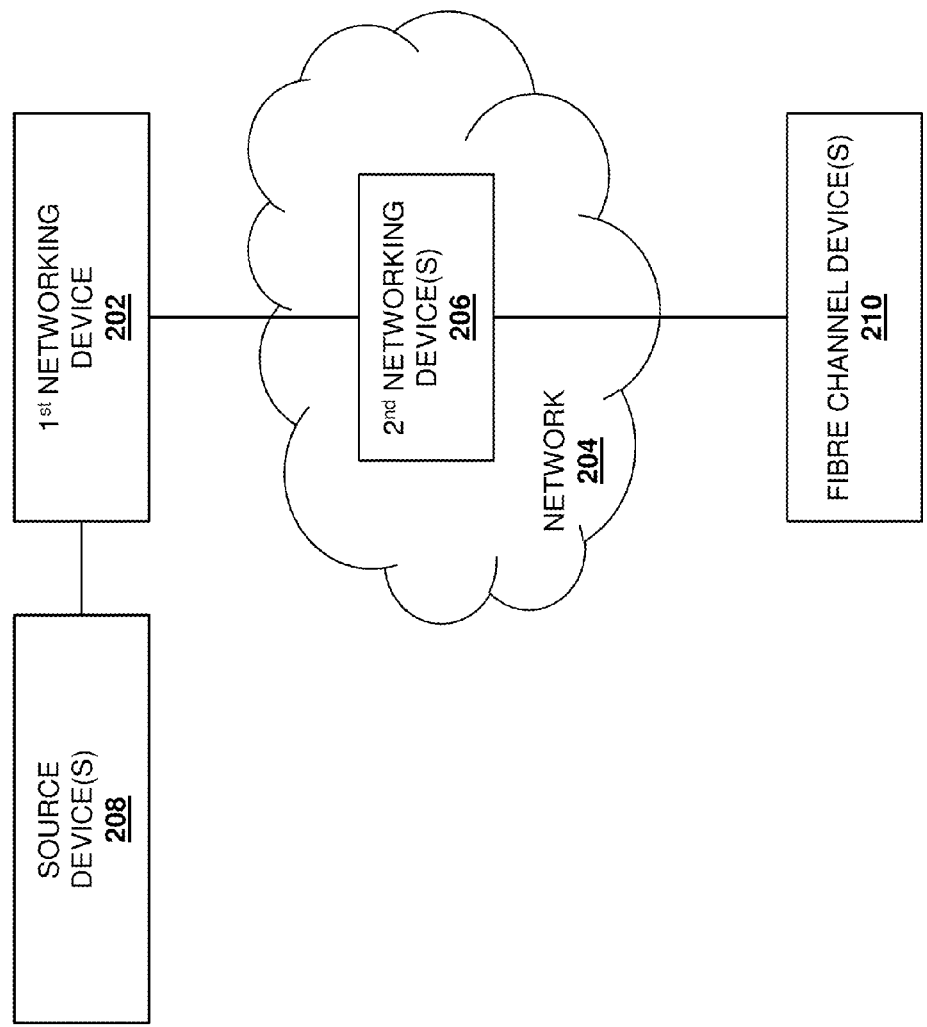
FIG. 2 is a schematic view illustrating an embodiment of an FCoE frame forwarding system.

Referring now to FIG. 2, an embodiment of Fibre Channel over Ethernet (FCoE) frame forwarding system 200 is illustrated. In the illustrated embodiment, the FCoE frame forwarding system 200 includes a first networking device 202 that is coupled to a network 204 including at least one second networking device 206. Any or all of the first networking device 202 and the second networking device(s) 206 may be the IHS 100 discussed above with reference to FIG. 1 and/or may include some or all of the components of the IHS 100. In a specific example, the first networking device 202 and the second networking device(s) 206 may be switches, although other networking devices are envisioned as falling within the scope of the present disclosure. In the embodiments discussed below, the first networking device 202 is discussed as providing the new functionality taught in the present disclosure, while the second networking device(s) 206 provide that new functionality, or may provide conventional functionality. As such, different combinations of the first networking device 202 and the second networking device(s) 206 may provide conventional functionality or the new functionality of the present disclosure while remaining within the scope of the present disclosure.

One or more source devices 208 are coupled to the first networking device 202. In an embodiment, the source device(s) 208 may be the IHS 100 discussed above with reference to FIG. 1 and/or may include some or all of the components of the IHS 100. In a specific example, the source device(s) 208 may be servers, although other source devices are envisioned as falling within the scope of the present disclosure. One or more fibre channel devices 210 are coupled to the network 204 (e.g., via a coupling to at least one of the second networking device(s) 206). In an embodiment, the fibre channel device(s) 210 may be the IHS 100 discussed above with reference to FIG. 1 and/or may include some or all of the components of the IHS 100. In a specific example, the fibre channel device(s) 210 may be storage devices, although other fibre channel devices are envisioned as following within the scope of the present disclosure. While a specific embodiment of a networked system that provides the FCoE frame forwarding system 200 of the present disclosure has been provided, one of skill in the art in possession of the present disclosure will recognize that other networked systems having other devices and/or configurations will benefit from the present disclosure and thus fall within its scope.

Figure 3:
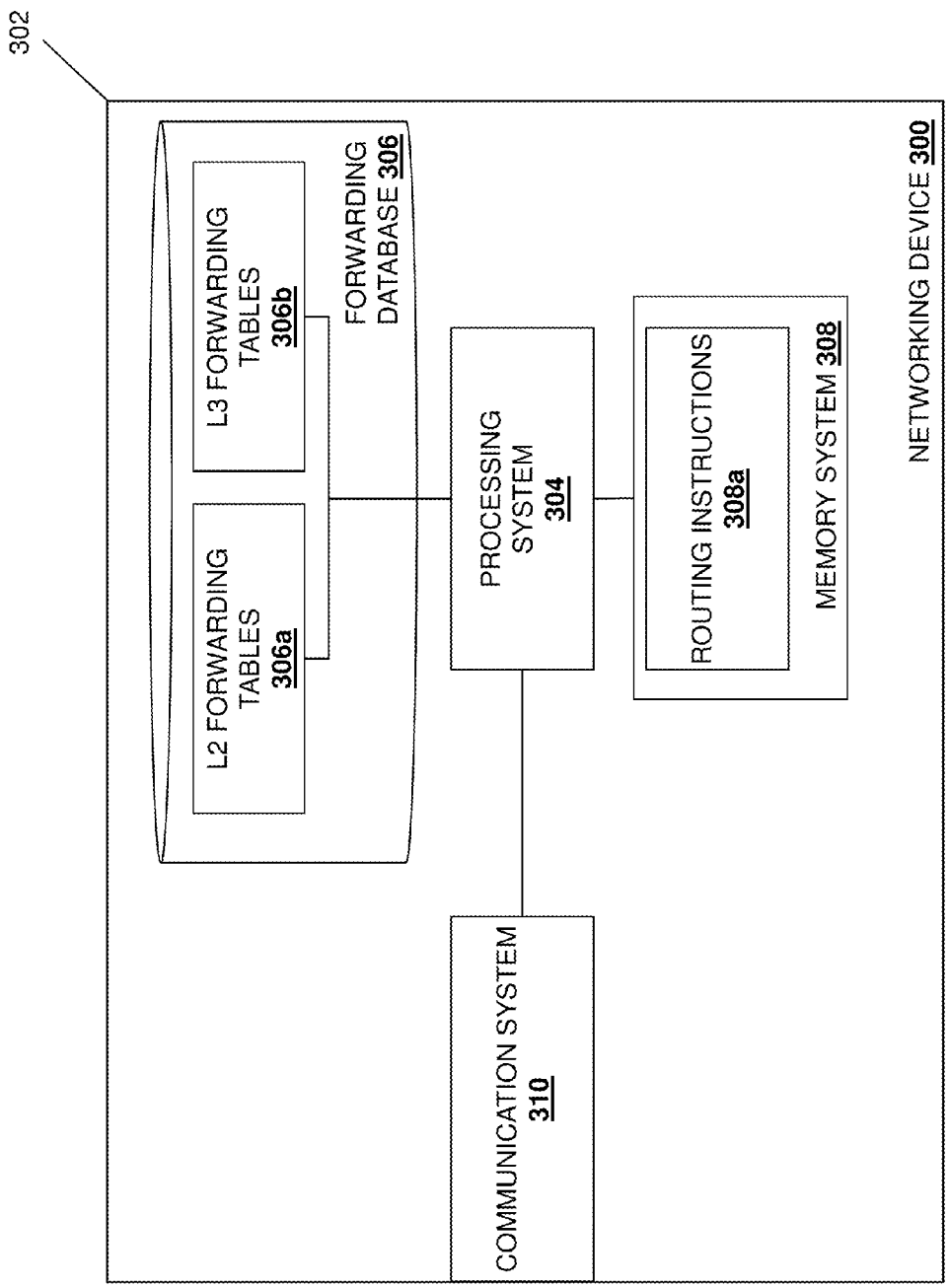
FIG. 3 is a schematic view illustrating an embodiment of a networking device used in the FCoE frame forwarding system of FIG. 3.

Referring now to FIG. 3, an embodiment of a networking device 300 is illustrated. In an embodiment, the networking device 300 may be the first networking device 202 and/or any of the second networking device(s) 206 of FIG. 2. As such, the networking device 300 may be the IHS 100 discussed above with reference to FIG. 1 and/or may include some or all of the components of the IHS 100. In specific examples, the networking device 300 may provide a switch, although other networking device will fall within the scope of the present disclosure. The networking device 300 includes a chassis 302 that houses the components of the networking device 300, only some of which are illustrated in FIG. 3. In the illustrated embodiment, the chassis houses a processing system 304. The processing system 304 may include one or more non-FCoE-enabled processors. For example, the processing system 304 may include one or more non-FCoE-enabled switch chips such as, for example, non-FCoE-enabled Ethernet switch chips that have not been enable for FCoE forwarding operations. As discussed above, non-FCoE-enabled Ethernet switch chips are far more available and less expensive relative to FCoE-enabled switch chips, and thus their inclusion in the networking device 300 to provide the processing system 302 provides for a less expensive networking device 300. However, other non-FCoE-enabled processing systems are envisioned as falling within the scope of the present disclosure.

The chassis 302 also houses a storage system (not illustrated, but which may include the storage device 108 discussed above with reference to FIG. 1) that includes a forwarding database 306 that is coupled to the processing system 304 (e.g., via a coupling between the processing system 302 and the storage system). The forwarding database 306 includes layer 2 (L2) forwarding tables 306a and layer 3 (L3) forwarding tables 306b. As is known in the art, L2 forwarding tables conventionally provide forwarding information that allows packets to be forwarded based on a destination Media Access Control (MAC) address in that packet, while L3 forwarding tables conventionally provide forwarding information that allows packets to be forwarded based on a destination Internet Protocol (IP) address in that packet. In the specific embodiments discussed below, the L3 forwarding tables provide for the forwarding of IP version 4 (IPv4) packets. However, other types of L3 packets known in the art may benefit from the teachings of the present disclosure and one of skill in the art in possession of the present disclosure will recognize how the present disclosure may be modified such that those other types of L3 packets may be forwarded using the teachings provided herein while falling within its scope.

As discussed above, the number of conventional user-defined forwarding or routing table entries available in conventional L2 forwarding tables for use by conventional non-FCoE-enabled switch chips in conventional non-FCoE-enabled switching systems is limited, which limits the number of forwarding entries available in the conventional L2 forwarding tables for transmitting FCoE communications, and thus limits the size of the FCoE network fabric that can be utilized with such conventional L2 forwarding tables. However, as discussed below, the FCoE frame forwarding system is configured to utilize the larger L3 forwarding tables, which allows for much larger FcoE network fabrics when using non-FCoE-enabled switching systems/non-FCoE-enabled processing systems.

The chassis 302 also houses a memory system 308 that is coupled to the processing system 304 and that includes routing instructions 308a. In an embodiment, the memory system 308 may include one or more memory devices (not illustrated, but which may be provided by the system memory 114 discussed above with reference to FIG. 1) that stores the routing instructions 308a. As discussed below, the routing instructions 308a included on the memory system 308 are modified from conventional routing instructions utilized by non-FCoE-enabled processing systems in order to allow the processing system 304 to utilize the L3 forwarding tables 306b in the forwarding database 306 to forward FCoE packets/frames as discussed below. For example, due at least in part to the maturity of IPv4, the conventional processing systems that utilize conventional L3 forwarding tables have several built in rules and behaviors that provide a hardware assist in processing IPv4 frames and, as a result, conventional default L3 forwarding behavior of Ethernet switch chips must be modified to perform the FCoE frame forwarding discussed below.

For example, modifications to conventional routing instructions to provide the routing instructions 308a for the processing system 304 of the present disclosure may include disabling IP address validity checks in communications received from source devices, as the IP addresses generated and used in the L3 forwarding tables 306b as described below will not appear valid when such a check is run. Further modifications to conventional routing instructions to provide the routing instructions 308a for the processing system 304 of the present disclosure may include disabling of time-to-live field modifications, and disabling of L3 forwarding when no conventional L3 forwarding information is provided in the L3 forwarding tables (discussed in further detail below). Furthermore, the routing instructions 308a for the processing system 304 may include instructions to use the FCoE frame information in received FCoE frames as discussed below, and/or any other instructions that would enabled the functionality discussed below. One of skill in the art in possession of the present disclosure will recognize that the disablement of features that are otherwise utilized by a non-FCoE-enabled Ethernet switch chips allows for the forwarding behavior discussed below in which the non-FCoE-enabled Ethernet switch chips forward FCoE frames as if they were IP frames (i.e., using the L3 forwarding tables along with information in the FCoE frames that corresponds to information in standard IP frame locations). As such, readily available and relatively inexpensive non-FCoE-enabled Ethernet switch chips may be used to forward FCoE frames.

The chassis 302 also houses a communication system 310 that is coupled to the processing system 304. In the embodiments discussed below, the communication system 310 is provided by a Network Interface Controller (NIC) that includes ports (e.g., Ethernet ports) for coupling to the source device(s) 208, second networking device(s) 206, and/or fibre channel device(s) 210. However, the communication system 310 may include a variety of other communication devices such as, for example, wireless communication devices such as BLUETOOTH® wireless communication devices, Near Field Communication (NFC) devices, WiFi wireless communication devices, and/or other communication devices known in the art while remaining within the scope of the present disclosure. While a specific networking device 300 having specific components has been illustrated, one of skill in the art in possession of the present disclosure will that different networking devices having different components will fall within the scope of the present disclosure, and that the networking device 300 may include a variety of conventional networking device components and/or features that will provide for conventional networking functionality while remaining within the scope of the present disclosure.

Figure 4:
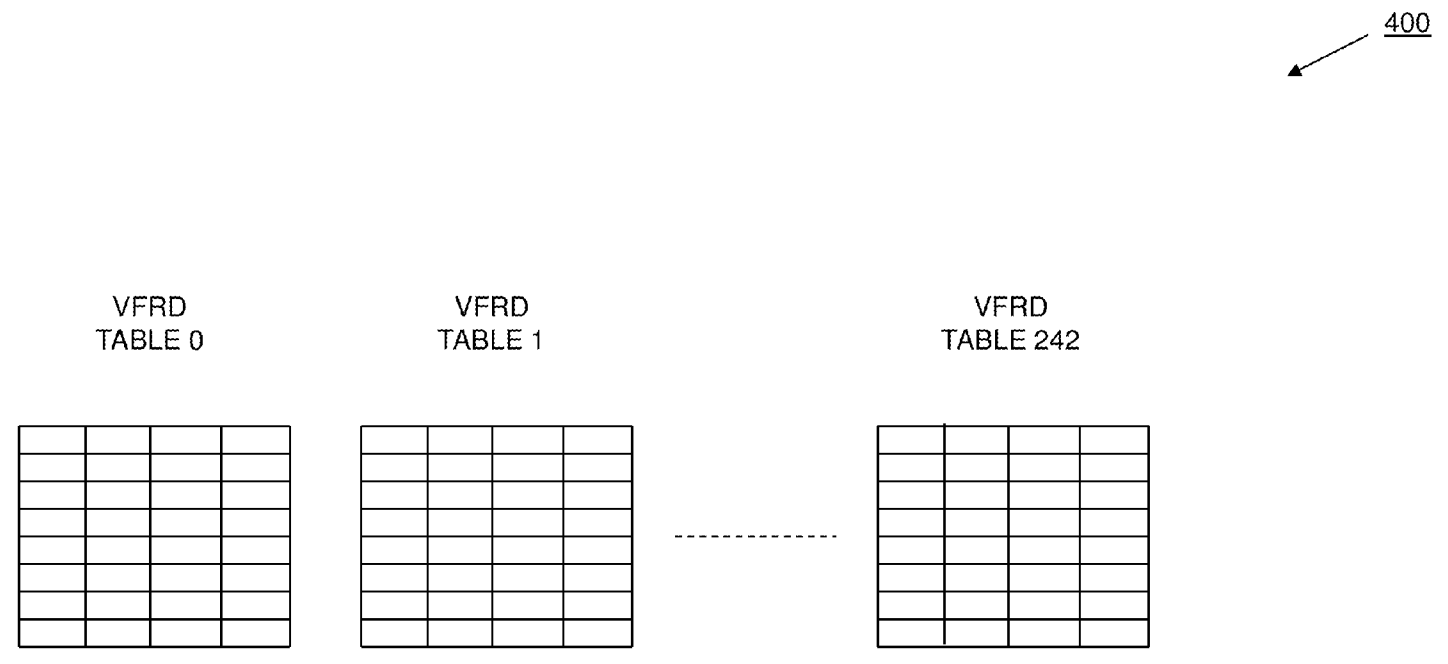

Referring now to FIG. 4, an embodiment of a Virtual Fabric Routing Domain (VFRD) 400 is illustrated. As discussed in further detail below, the VFRD 400 may be provided by a plurality of VFRD tables that are provided as the L3 forwarding tables 306b in the forwarding database 306. For example, FIG. 4 illustrates a VFRD table 0, and VFRD table 1, and up to a VFRD table 242. As discussed below, the source Internet Protocol byte 3 ("source IP B3") field in an IPv4 frame includes 243 possible entries (i.e., 0-242), and each of those entries may correspond to a different VFRD table (e.g., a "0" entry in the source IP B3 field in the IPv4 frame may correspond to the VFRD table 0, a "1" entry in the source IP B3 field in the IPv4 frame may correspond to the VFRD table 1, and so on). As such, up to 243 VFRD tables may be created to provide the VFRD 400, although in many situations fewer VFRD tables (and even a single VFRD table) will be sufficient to provide a desired size for the FCoE network fabric. As discussed below, networking devices according to the present disclosure may include any number of the VFRD tables (e.g., from 1 and up to all 243 of them), different networking devices may include different VFRD tables, and a plurality of networking devices in an FCoE network fabric may share a single VFRD table (e.g., the VFRD table 0) or multiple VFRD tables.

Figure 5:
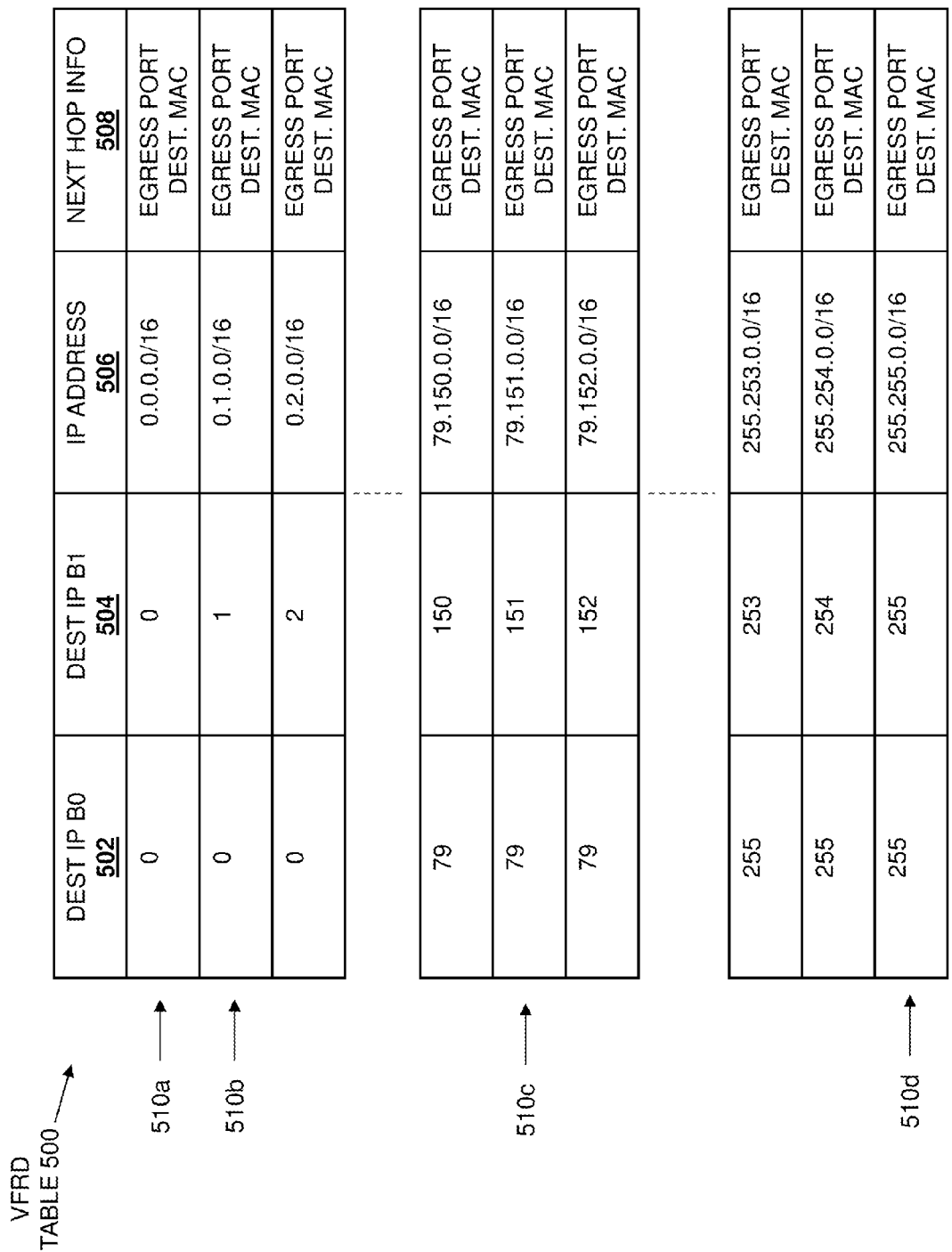
FIG. 5 is a schematic view illustrating an embodiment of a VFRD.

Referring now to FIG. 5, an embodiment of the VFRD table 500 is illustrated. In the embodiments discussed below, the VFRD table 500 is the VFRD table 0 of FIG. 4 that provides the VFRD 400. However, one of skill in the art in possession of the present disclosure will recognize that VFRD tables similar to the VFRD table 500 may be provided for any of the VFRD tables 0-242 that provide the VFRD 400 while remaining within the scope of the present disclosure. In the illustrated embodiment, the VFRD table 500 includes a destination Internet Protocol byte 0 (destination IP B0) column 502, a destination Internet Protocol byte 1 (destination IP B1) column 504, and IP address column 506, and a next hop information column 508. As discussed below, the destination IP B0 field in an IPv4 frame includes 256 possible entries (i.e., 0-255), and any of those entries may correspond to an entry in the destination IP B0 column 502. Similarly, the destination IP B1 field in an IPv4 frame includes 256 possible entries (i.e., 0-255), and any of those entries may correspond to an entry in the destination IP B1 column 504. As illustrated in FIG. 5, the VFRD table 500 includes a plurality of rows 510a, 510b, 510c, and up to 510d.

As can be seen, for each row in the VFRD table 500, specific combinations of the destination IP B0 entry in the destination IP B0 column 502 and the destination IP B1 entry in the destination IP B1 column 504 are associated with an IP address entry in the IP address column 506 and next hop information in the next hop information column 508. For example, in row 510a, the combination of the "0" in the destination IP B0 column 502 and the "0" in the destination IP B1 column 504 are associated with a "0.0.0.0/16" IP address in the IP address column 506 and a specific egress port and destination MAC address in the next hop information column 508. Similarly, in row 510b, the combination of the "0" in the destination IP B0 column 502 and the "1" in the destination IP B1 column 504 are associated with a "0.1.0.0/16" IP address in the IP address column 506 and a specific egress port and destination MAC address in the next hop information column 508. Similarly, in row 510c, the combination of the "79" in the destination IP B0 column 502 and the "151" in the destination IP B1 column 504 are associated with a "79.151.0.0/16" IP address in the IP address column 506 and a specific egress port and destination MAC address in the next hop information column 508. Similarly, in row 510d, the combination of the "255" in the destination IP B0 column 502 and the "255" in the destination IP B1 column 504 are associated with a "255.255.0.0/16" IP address in the IP address column 506 and a specific egress port and destination MAC address in the next hop information column 508. While the example above provides IP addresses with a format of "x.y.0.0/16" for destination IP B0 values of "x" and destination IP B1 values of "y", other formats for relating the IP address, destination IP B0 value, and destination IP B1 value are envisioned as falling within the scope of the present disclosure.

Figure 6:
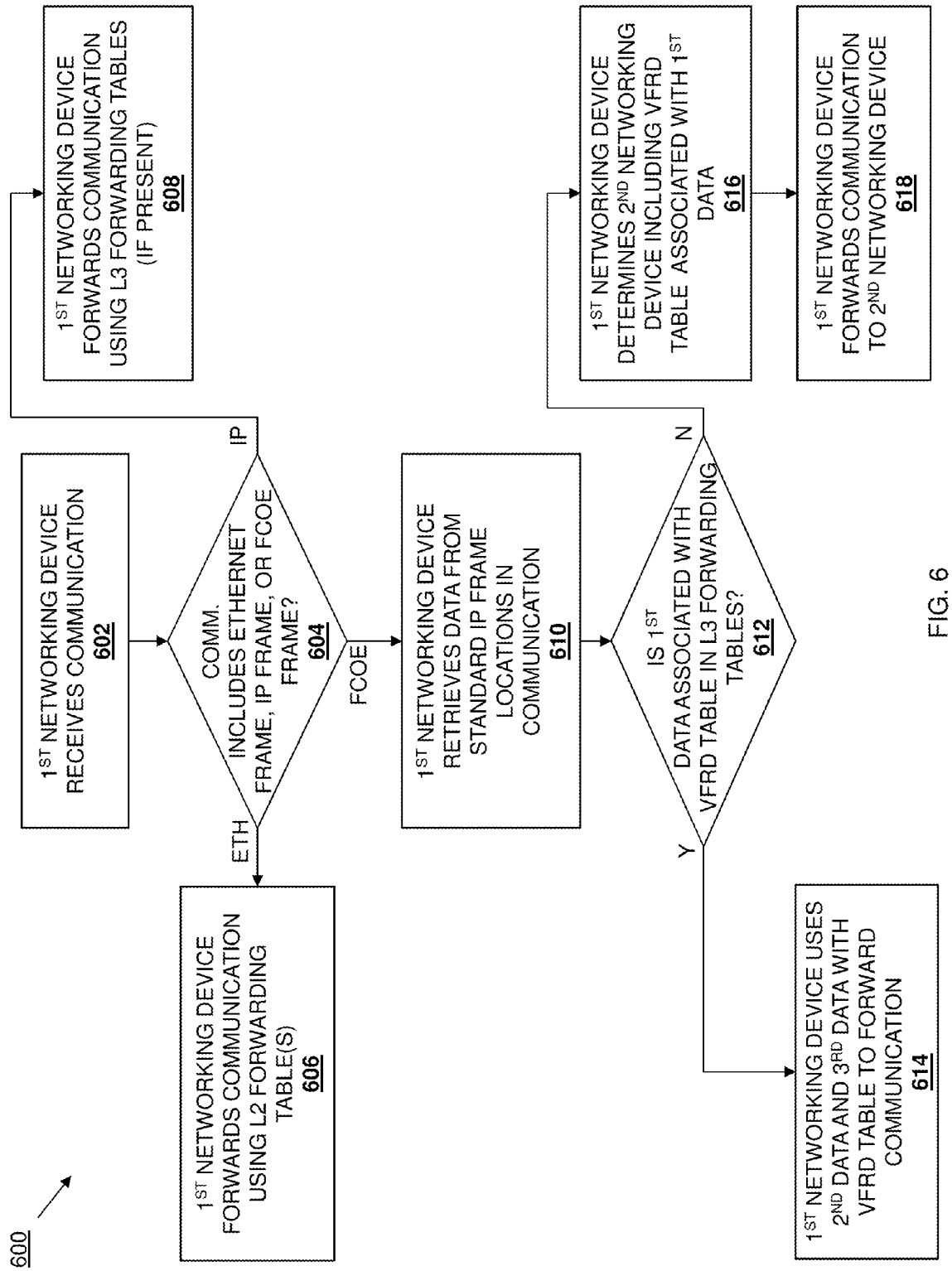
FIG. 6 is a flow chart illustrating an embodiment of a method for forwarding FCoE frames.

Referring now to FIG. 6, an embodiment of a method 600 for forwarding FCoE frames is illustrated. As discussed below, embodiments of the systems and methods of the present disclosure take advantage of the similarities between the headers for FCoE frames and IP frames, specifically the correspondence of the locations the FC DID Domain field in the FCoE header and the Source IP B3 field in the IP header, the FC DID Area field in the FCoE header and the Destination IP B0 field in the IP header, and the FC DID Port field in the FCoE header and the Destination IP B1 field in the IP header. It has been discovered that modified/new routing instructions for non-FCoE-enabled Ethernet switch chips and the overlap of these FCoE and IP header fields allows for the utilization of L3 forwarding tables (e.g., IPv4 forwarding tables) by the non-FCoE-enabled Ethernet switch chips for the forwarding of FCoE frames. The execution of those modified/new routing instructions by the non-FCoE-enabled Ethernet switch chips operates to create a new virtual address space (i.e., the VFRD) that may be referenced utilizing the value in the FC DID Domain field that corresponds to the Source IP B3 field, and then operates to route FCoE frames using the referenced VFRD and the combination of the values in the FC DID Area field and the FC DID Port field that correspond to the Destination IP B0 field and the Destination IP B1 field, respectively. Given that there are 256 possible entries in each of the destination IP B0 field and destination IP B1 field of an IP frame, this provides for 65535 (i.e., 256×256) addressable FCoE entries (and thus FCoE devices that may be forwarded to) per VFRD table, thus greatly increasing the size of available FCoE network fabric when utilizing a non-FCoE-enabled Ethernet switch chips.

The method 600 begins at block 602 where a first networking device receives a communication. Prior to the method 600, the VFRD tables may be set up (i.e., have the information discussed above populated in the VFRD tables), distributing to the networking device(s), and/or otherwise implemented for their use below during the method 600 using a variety of forwarding table implementation techniques known in the art. For example, once the non-FCoE-enabled Ethernet switch chip is configured (e.g., as a mapper), the VFRD tables may be populated with the first byte being a valid fixed FC domain ID (i.e., 1-232 in this embodiment). Then when any device on that domain (i.e., up to 65535 of them in this embodiment) performs a Fabric Login (FLOGI) or Fabric Discovery (FDISC) into the FCoE network fabric over FCoE, the remaining 2 bytes from the FC ID may be set for the individual device ID for that device and the corresponding port in the VFRD.

In an embodiment of block 602, the first networking device 202 may receive a communication from the source device(s) 208 that is directed to the fibre channel device(s) 210. For example, the processing system 304 in the networking device 300 may receive the communication at block 602 from the source device(s) 208 through the communication system 310. In an embodiment, data for writing to the fibre channel device(s) 210, a request for data from the fibre channel device(s) 210, and/or a variety of other communications know in the art. While the communication at block 602 is illustrated and discussed as being received by the first networking device 202 from the source device(s), the communication received by the first networking device 202 may be received from the second networking device(s) 206 (e.g., data provided by the fibre channel device(s) 210, confirmation of writes by the fibre channel device(s) 210, etc.), and/or from any other devices know in the art while remaining within the scope of the present disclosure.

Figure 7:
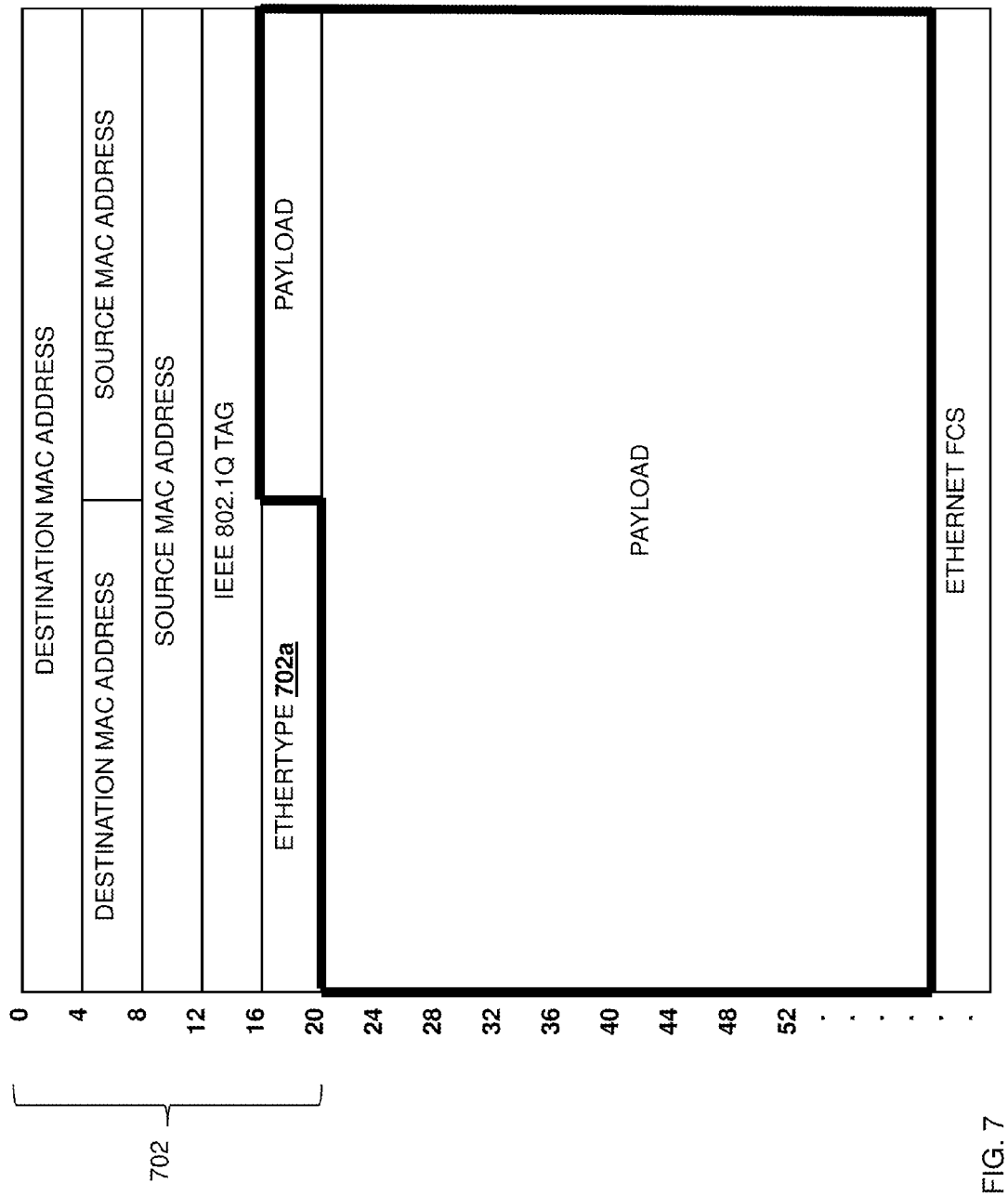
FIG. 7 is a schematic view illustrating an embodiment of a non-FCoE/non-IP Ethernet frame.

The method 600 then proceeds to decision block 604 it is determined whether the communication received at block 602 includes an Ethernet frame (i.e., a non-FCoE/non-IP Ethernet frame), an IP frame, or an FCoE frame. In an embodiment, the first networking device 202 may determine at decision block 604 a type of frame in the communication received from the source device(s) 208. For example, the processing system 304 in the networking device 300 may examine the header of the communication received at block 602 to determine the type of frame included in that communication. Referring now to FIG. 7, an embodiment of a non-FCoE/non-IP Ethernet frame 700 is illustrated. The non-FCoE/non-IP Ethernet frame 700 includes a header 702 having a variety of information fields including an ethertype field 702a. In an embodiment of decision block 604, the processing system 302 in the networking device 300 may examine the header 702 of the non-FCoE/non-IP Ethernet frame 700 and determine the value in the ethertype field 702a is associated with a non-FCoE/non-IP Ethernet frame. As discussed below, FCoE frames may include an ethertype of 0x8906 and IPv4 frames may include an ethertype of 0x0800, while a non-FCoE/non-IP Ethernet frame may include variety of different ethertypes that may identify different protocols. As such, at decision block 604 any ethertype other than 0x8906 and 0x0800 may cause the communication to be interpreted as including a non-FCoE/non-IP Ethernet frame. However, the determination that the communication received at block 602 includes a non-FCoE/non-IP Ethernet frame may be performed using other techniques and other information while remaining within the scope of the present disclosure.

Figure 8:
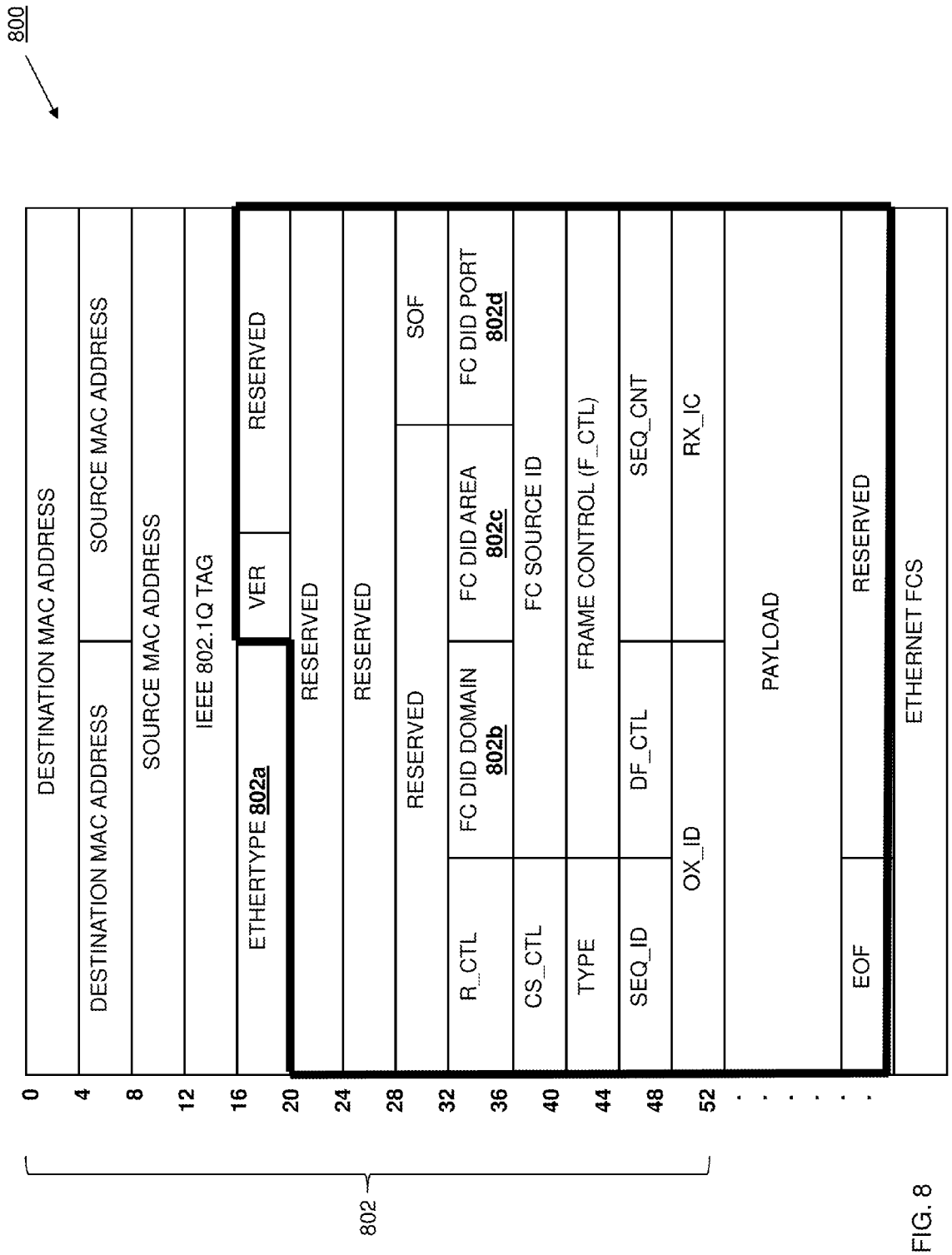
FIG. 8 is a schematic view illustrating an embodiment of an FCoE frame.
Figure 9:
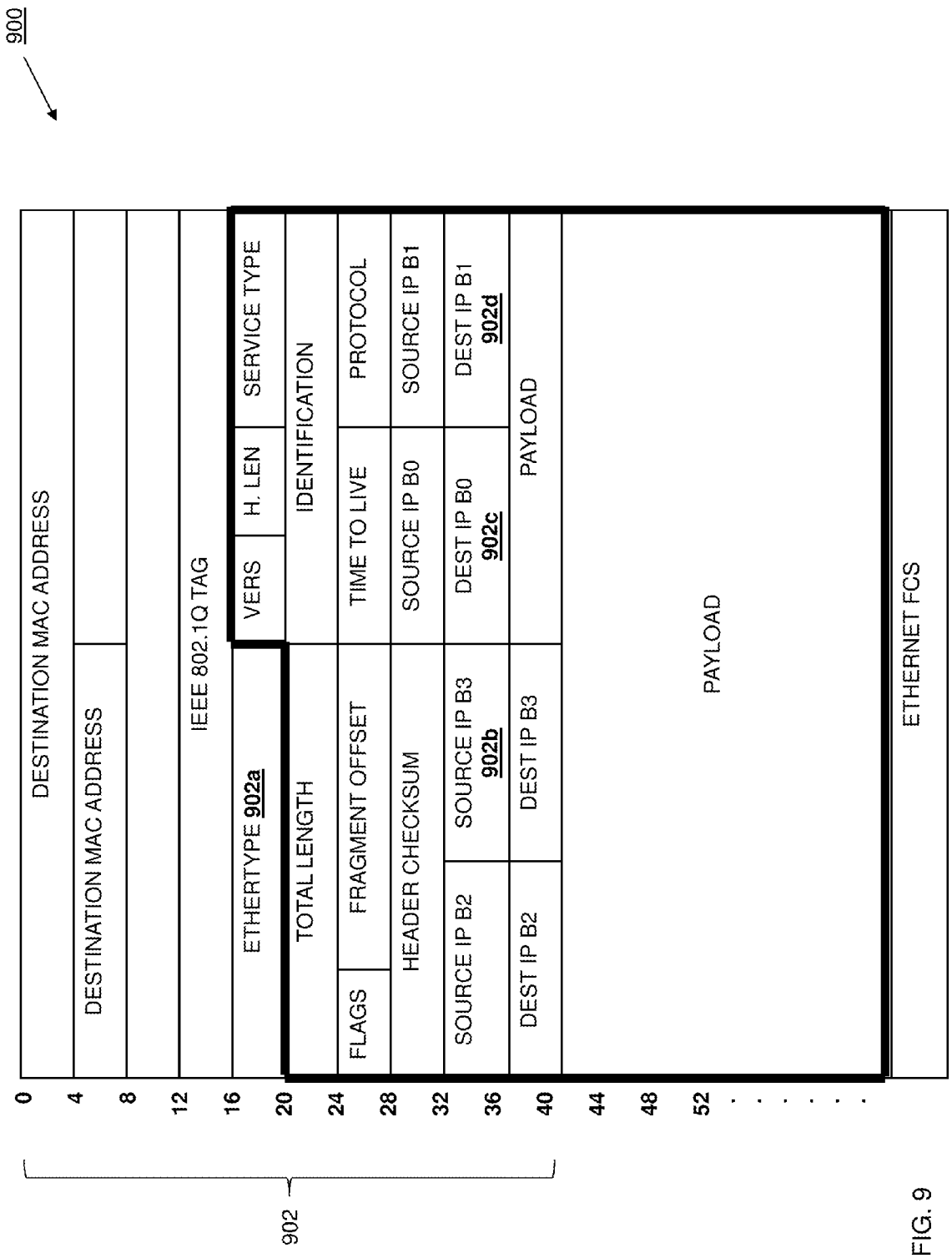
FIG. 9 is a schematic view illustrating an embodiment of an IP frame.

Referring now to FIG. 8, an embodiment of an FCoE frame 800 is illustrated. The FCoE frame 800 includes a header 802 having a variety of information fields including an ethertype field 802a. In an embodiment of decision block 604, the processing system 302 in the networking device 300 may examine the header 802 of the FCoE frame 800 and determine the value in the ethertype field 802a is associated with an FCoE frame. As such, at decision block 604 an ethertype of 0x8906 may cause the communication to be interpreted as including an FCoE frame. However, the determination that the communication received at block 602 includes an FCoE frame may be performed using other techniques and other information while remaining within the scope of the present disclosure. Referring now to FIG. 9, an embodiment of an IP frame 900 is illustrated. The IP frame 900 includes a header 902 having a variety of information fields including an ethertype field 902a. In an embodiment of decision block 604, the processing system 302 in the networking device 300 may examine the header 902 of the IP frame 900 and determine the value in the ethertype field 902a is associated with an IPv4 frame. As such, at decision block 604 an ethertype of 0x0800 may cause the communication to be interpreted as including an IPv4 frame. However, the determination that the communication received at block 602 includes an IP frame may be performed using other techniques and other information while remaining within the scope of the present disclosure.

If, at decision block 604, the first networking device 202 determines that the communication received at block 602 includes a non-FCoE/non-IP frame (e.g., the ethertype in the header of the communication is not 0x8906 or 0x0800), the method 600 proceeds to block 606 where the first networking device forwards the communication using L2 forwarding tables. In an embodiment, in response to determining that the communication includes a non-FCoE/non-IP frame, the processing system 304 accesses the L2 forwarding tables 306a in the forwarding database 306 and uses conventional L2 forwarding techniques to determine how to forward the communication received at block 602. Subsequent to making that determination, the processing system forwards the communication through the communication system 310.

If, at decision block 604, the first networking device 202 determines that the communication received at block 602 includes an IP frame (e.g., the ethertype in the header of the communication is 0x0800), the method 600 proceeds to block 606 where the first networking device forwards the communication using conventional L3 forwarding tables if they are present. As discussed above, the L3 forwarding tables 306b in the forwarding database 306 of the networking device 300 may be utilized, at least in part, to provide the VFRD tables (e.g., the VFRD table 500) of the VFRD 400. While in some embodiments, all of the L3 forwarding tables 306b in the forwarding database 306 may be utilized as VFRD tables and thus may not leave any of the L3 forwarding tables 306b for use in conventional L3 forwarding, in many embodiments, some of the L3 forwarding tables 306b may be available in the L3 forwarding database 306a for use in performing conventional L3 forwarding operations. As discussed above, in the event there are no L3 forwarding tables available for conventional L3 forwarding, conventional L3 forwarding operations may be disabled in the networking device 300 via the routing instructions 308a in the memory system 308. In such embodiments, communications including IP frames received at the networking device 300 may be dropped. However, when L3 forwarding tables 306b are available in the forwarding database 306 for conventional L3 forwarding operations, in response to determining that the communication includes an IP frame, the processing system 304 accesses the L3 forwarding tables 306b and uses conventional L3 forwarding techniques to determine how to forward the communication received at block 602. Subsequent to making that determination, the processing system forwards the communication through the communication system 310.

If, at decision block 604, the first networking device 202 determines that the communication received at block 602 includes an FCoE frame (e.g., the ethertype in the header of the communication is 0x8906), the method 600 proceeds to block 610 where the first networking device retrieves data from standard IP frame locations in the communication. Referring first to the IP frame 900 illustrated in FIG. 9, the header 902 includes a source IP address with bytes 0, 1, 2, and 3 (B0, B1, B2, and B3) of the source IP address in different fields, and a destination IP address with bytes 0, 1, 2, and 3 (B0, B1, B2, and B3) of the destination IP address in different fields. For example, the source IP B3 field 902b is located in field location 37 in the IP frame 900, the destination IP B0 field 902c is located in field location 38 in the IP frame 900, and the destination IP B1 field 902d is located in field location 39 in the IP frame 900. As such, the field locations 37, 38, and 39 in the IP frame 900 may be considered standard IP frame locations for the source IP B3 value, the destination IP B0 value, and the destination IP B1 value (i.e., the last byte of the source IP address and the first two bytes of the destination IP address) in the header 902 of the IP frame 900.

Referring next to the FCoE frame 800 illustrated in FIG. 8, the header 802 includes a Fibre Channel (FC) destination identifier (DID) with the FC DID domain provided in a first field, the FC DID area provided in a second field, and the FC DID port provided in a third field. For example, the FC DID domain field 802b is located in field location 37 in the FCoE frame 800, the FC DID area field 802c is located in field location 38 in the FCoE frame 800, and the FC DID port field 802d is located in field location 39 in the FCoE frame 800. As such, the field locations 37, 38, and 39 in the header 802 of the FCoE frame 800 correspond to the standard IP frame locations for the source IP B3 field, the destination IP B0 field, and the destination IP B1 field in the header 902 of the IP frame 900. Thus, at block 610, processing system 304 may retrieve data that is associated with standard IP frame locations in an IP frame (i.e., the source IP B3 field, destination IP B0 field, and destination IP B1 field) from the FC DID domain field 802b, the FC DID area field 802c, and the FC DID port field 802d in the FCoE frame that was included in the communication received at block 602. While a specific embodiment has been illustrated and described, in other embodiments the retrieval of the data from standard IP frame locations in the FCoE frame may be performed utilizing different standard IP frame locations than those illustrated and described while remaining within the scope of the present disclosure.

The method then proceeds to decision block 612 where the first networking device determines whether first data retrieved at block 610 is associated with a VFRD table provided in the L3 forwarding tables. In an embodiment, the processing system 304 in the networking device 300 may utilize first data retrieved from the FCoE frame (at the standard IP frame location) and the L3 forwarding tables 306b in the forwarding database 306 and determine whether that first data is associated with a VFRD table included in the L3 forwarding tables 306b. For example, the processing system 304 may utilize the FC DID domain value retrieved from the FC DID domain field 802b (which corresponds to the standard IP frame location/source IP B3 field 902b that would include a source IP B3 value in the IP frame 900) to determine whether that FC DID domain (which may be interpreted as a source IP B3 value by the processing system 304) is associated with a VFRD table in the L3 forwarding tables 306b. As discussed above, the source IP B3 field 902b provides for 243 possible values that may be associated with 243 different VFRD tables (e.g., VFRD tables 0-242 in FIG. 4), and thus the FC DID domain value retrieved from the FCoE frame 800 may be interpreted by the processing system 304 as the source IP B3 value from the IP frame 900 and used to identify a VFRD table in the L3 forwarding database 306b. In a specific example, the FC DID domain value retrieved from the FCoE frame 800 may be "0", and at decision block 612 the processing system 304 may interpret that as a source IP B3 value of "0" and determine that the source IP B3 value of "0" is associated with the VFRD 0. Similarly, an FC DID domain value of "1" may be interpreted at decision block 612 as a source IP B3 value of "1" and determined to be associated with the VFRD 1, an FC DID domain value of "2" may be interpreted at decision block 612 as a source IP B3 value of "2" and determined to be associated with the VFRD 2, and so on.

If, at decision block 612, the first networking device determines that the first data is associated with a VFRD table in the L3 forwarding tables, the method 600 proceeds to block 614 where the first networking device uses second data and third data retrieved at block 610 with the VFRD table determined to be associated with the first data at decision block 612 to forward the communication. As discussed above, at decision block 612 the processing system 304 in the networking device 300 may determine that first data retrieved at block 610 is associated with a VFRD table included in the L3 forwarding tables 306b. At block 614, the processing system may then utilize second data and third data retrieved at block 610 with that VFRD table to forward the communication received at block 602. As discussed above, the destination IP B0 field 902c provides for 256 possible values and the destination IP B1 field 902d provides for 256 possible values, and thus different combinations of the FC DID area value and the FC DID port value retrieved from the FCoE frame 800 may be utilized by the processing system 304 as different combinations of the destination IP B0 value and the destination IP B1 value from the IP frame 900 to reference any particular row in a VFRD table in the L3 forwarding database 306b to allow for the retrieval of forwarding instructions for up to 65535 different IP addresses and associated next hop information.

In a specific example, with reference to the VFRD table 500 in FIG. 5 (the VFRD table determined at decision block 612 in this example), the FC DID area value retrieved from the FCoE frame 800 may be "0" and the FC DID port value retrieved from the FCoE frame 800 may be "0", and at decision block 614 the processing system 304 may interpret those values as a destination IP B0 value of "0" and a destination IP B1 value of "0" and determine that the destination IP B0 value/destination IP B1 value combination of "0, 0" is associated with the row 510a in VFRD table 500. As per row 510a in the VFRD table 500, the particular egress port and destination MAC address in the next hop information column 508 that is associated with the IP address "0.0.0.0/16" (corresponding to that "0, 0" destination IP B0 value/destination IP B1 value combination) may then be used to forward the communication received at block 602. Similarly, an FC DID area value of "0" and the FC DID port value of "1" may be interpreted as a destination IP B0/destination IP B1 value combination "0, 1" associated with row 510b in the VFRD table 500, causing the particular egress port and destination MAC address in the next hop information column 508 that is associated with the IP address "0.1.0.0/16" (corresponding to that "0, 1" destination IP B0 value/destination IP B1 value combination) to be used to forward the communication received at block 602. Similarly, an FC DID area value of "79" and the FC DID port value of "151" may be interpreted as a destination IP B0/destination IP B1 value combination "79, 151" associated with row 510c in VFRD table 500, causing the particular egress port and destination MAC address in the next hop information column 508 that is associated with the IP address "79.151.0.0/16" (corresponding to that "79, 151" destination IP B0 value/destination IP B1 value combination) to be used to forward the communication received at block 602. Similarly, an FC DID area value of "255" and the FC DID port value of "255" may be interpreted as a destination IP B0/destination IP B1 value combination "255, 255" associated with row 510d in VFRD table 500, causing the particular egress port and destination MAC address in the next hop information column 508 that is associated with the IP address 255.255.0.0/16" (corresponding to that "255, 255" destination IP B0 value/destination IP B1 value combination) to be used to forward the communication received at block 602.

If, at decision block 612, the first networking device determines that the first data is not associated with a VFRD table in the L3 forwarding tables, the method 600 proceeds to block 616 where the first networking device determines a second networking device that includes a VFRD table that is associated with the first data. In an embodiment, in response to determining that the FC DID domain value retrieved from the FCoE frame 800 at block 610 (and interpreted as a source IP B3 value) is not associated with any VFRD tables in the L3 forwarding tables 306a of the forwarding database 306, the processing system 304 may determine whether any of the second networking device(s) 206 are associated with the VFRD table corresponding to that FC DID domain value/source IP B3 value. For example, the processing system 304 may reference an access control list (ACL) (e.g., stored in the memory system 308 or other storage system) that includes ACL entries that detail networking device/VFRD table relationships (e.g., each ACL entry may indicate a networking device along with VFRD table(s) included on that network device.)

In a specific example, the networking device 300 may include the VFRD table 0, and at decision block 302 the processing system 304 may determine that the FC DID domain value retrieved from the FCoE frame at block 610 (which is interpreted as a source IP B3 value by the processing system 304) has a value of "10". Because the FC DID domain value/source IP B3 value of "10" corresponds to the VFRD table 10 (in this example), and the VFRD table 10 is not located in the L3 forwarding table 306a of the networking device 300 (in this example), the networking device 300 may reference its ACL to find an ACL entry that indicates at least one of the other networking devices in the FCoE frame forwarding system 200 that includes the VFRD table 10. The method 600 may then proceed to block 618 where the first networking device forwards the communication to the second networking device determined at block 616. In an embodiment, the processing system 304 may then forward the communication received at block 602 to the networking device determined at block 616 (e.g., one or more of the second networking device(s) 206.) While an example of the use of an ACL to determine a different networking device that includes a VFRD table referenced in the header of a FCoE frame has been provided, one of skill in the art in possession of the present disclosure will recognize that other techniques may be used to provide the FCoE frame to the networking device that includes the VFRD table needed to forward that FCoE frame.

Thus, systems and methods have been described that provide for the forwarding of FCoE frames using a non-FCoE-enabled processing system and that allows for the use of L3 forwarding tables that results in the ability to provide much larger FCoE network fabrics than could be previously realized using non-FCoE-enabled processing systems. The systems and methods provide L3 forwarding table reference information in FCoE frame locations that correspond to standard IP frame locations in an IP frame, and that L3 forwarding table reference information may be retrieved from the FCoE frame locations, interpreted by the non-FCoE-enabled processing system as information retrieved from an IP frame, and used to reference a specialized L3 forwarding table and determine an entry in that specialized L3 forwarding table that provides forwarding information for the FCoE frame (e.g., an egress port and a destination MAC address). As discussed above, the number of values allowable in the standard IP frame locations such as the source IP B3 field, destination IP B0 field, and destination IP B1 field, provide for 243 VFRD tables and 65535 entries in each VFRD table, resulting in almost 16 million possible next hops via the VFRD tables. As such, substantial increases in FCoE network fabric size may be realized along with the utilization of non-FCoE-enabled processing systems that substantially reduce the costs of those FCoE network fabrics.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Fibre Channel over Ethernet (FCoE) forwarding system, comprising:
   a source device;
   a Fibre Channel (FC) device;
   a first non-FCoE-enabled networking device that includes a plurality of L3 forwarding tables, wherein the first non-FCoE-enabled networking device is coupled between the source device and the FC device and is configured to:
      receive a first communication from the source device;
      determine that the first communication includes a first FCoE frame;
      retrieve first data from a first standard IP frame location in the first FCoE frame, second data from a second standard IP frame location in the first FCoE frame, and third data from a third standard IP frame location in the first FCoE frame;
      use the first data retrieved from the first FCoE frame to reference a first L3 forwarding table of the plurality of L3 forwarding tables; and
      use the first L3 forwarding table with the second data and the third data retrieved from the first FCoE frame to forward the first FCoE frame on to the FC device.

2. The FCoE forwarding system of claim 1, wherein the first non-FCoE-enabled networking device includes an L2 forwarding table, and wherein the first non-FCoE-enabled networking device is configured to:
   receive a second communication from the source device;
   determine that the second communication includes an Ethernet frame; and
   forward the Ethernet frame using the L2 forwarding table.

3. The FCoE forwarding system of claim 1, wherein the first non-FCoE-enabled networking device is configured to determine that the first communication includes the first FCoE frame by retrieving an ethertype from the first communication.

4. The FCoE forwarding system of claim 1, wherein the first standard IP frame location is a source Internet Protocol (IP) byte 3 field for an IP frame, the second standard IP frame location is a destination IP byte 0 field for the IP frame, and the third standard IP frame location is a destination IP byte 1 field for the IP frame.

5. The FCoE forwarding system of claim 1, wherein the first standard IP frame location in the first FCoE frame corresponds to an FC destination identifier (DID) domain field in the first FCoE frame, the second standard IP frame location in the first FCoE frame corresponds to an FC DID area field in the first FCoE frame, and the third standard IP frame location in the first FCoE frame corresponds to an FC DID port field in the first FCoE frame.

6. The FCoE forwarding system of claim 1, wherein the first non-FCoE-enabled networking device is configured to:
   receive a third communication from the source device;
   determine that the third communication includes a second FCoE frame;
   retrieve first data from the first standard IP frame location in the second FCoE frame;
   determine that the first data retrieved from the second FCoE frame is not associated with an L3 forwarding table of the plurality of L3 forwarding tables;
   determine a second non-FCoE-enabled networking device that includes an L3 forwarding table that is associated with the first data retrieved from the second FCoE frame; and
   forward the second FCoE frame to the second non-FCoE-enabled networking device.

7. The FCoE forwarding system of claim 1, wherein the first non-FCoE-enabled networking device is configured to not check the validity of IP addresses in communications received from the source device.

8. An information handling system (IHS), comprising:
   a communication system;
   a storage system that includes a database;
   a non-FCoE-enabled processing system that is coupled to the communication system and the storage system; and
   a memory system that is coupled to the non-FCoE-enabled processing system and that includes instructions that, when executed by the non-FCoE-enabled processing system, cause the non-FCoE-enabled processing system to provide a Fibre Channel over Ethernet (FCoE) forwarding engine that is configured to:
      receive a first communication through the communication system;
      determine that the first communication includes a first FCoE frame;
      retrieve first data from a first standard IP frame location in the first FCoE frame, second data from a second standard IP frame location in the first FCoE frame, and third data from a third standard IP frame location in the first FCoE frame;
      use the first data retrieved from the first FCoE frame to reference a first L3 forwarding table in the database; and
      use the first L3 forwarding table with the second data and the third data retrieved from the first FCoE frame to forward the first FCoE frame through the communication system.

9. The IHS of claim 8, wherein the FCoE forwarding engine is configured to:
   receive a second communication through the communication system;
   determine that the second communication includes an Ethernet frame;
   forward the Ethernet frame using an L2 forwarding table in the database.

10. The IHS of claim 8, wherein the first standard IP frame location is a source Internet Protocol (IP) byte 3 field for an IP frame, the second standard IP frame location is a destination IP byte 0 field for the IP frame, and the third standard IP frame location is a destination IP byte 1 field for the IP frame.

11. The IHS of claim 8, wherein the first standard IP frame location in the first FCoE frame corresponds to an FC destination identifier (DID) domain field in the first FCoE frame, the second standard IP frame location in the first FCoE frame corresponds to an FC DID area field in the first FCoE frame, and the third standard IP frame location in the first FCoE frame corresponds to an FC DID port field in the first FCoE frame.

12. The IHS of claim 8, wherein the FCoE forwarding engine is configured to:
   receive a third communication through the communication system;
   determine that the third communication includes a second FCoE frame;
   retrieve first data from the first standard IP frame location in the second FCoE frame;
   determine that the first data retrieved from the second FCoE frame is not associated with an L3 forwarding table in the database;
   determine a second non-FCoE-enabled networking device that includes an L3 forwarding table that is associated with the first data retrieved from the second FCoE frame; and
   forward the second FCoE frame to the second non-FCoE-enabled networking device through the communication system.

13. The IHS of claim 8, wherein the non-FCoE processing system is configured to not check the validity of IP addresses in communications received through the communication system.

14. A method for forwarding FCoE frames, comprising:
   receiving, by a first non-FCoE-enabled networking device, a first communication through a network;
   determining, by the first non-FCoE-enabled networking device, that the first communication includes a first FCoE frame;
   retrieving, by the first non-FCoE-enabled networking device, first data from a first standard IP frame location in the first FCoE frame, second data from a second standard IP frame location in the first FCoE frame, and third data from a third standard IP frame location in the first FCoE frame;
   using, by the first non-FCoE-enabled networking device, the first data retrieved from the first FCoE frame to reference a first L3 forwarding table; and
   using, by the first non-FCoE-enabled networking device, the first L3 forwarding table with the second data and the third data retrieved from the first FCoE frame to forward the first FCoE frame through the network.

15. The method of claim 14, further comprising:
   receiving, by the first non-FCoE-enabled networking device, a second communication through the network;
   determining, by the first non-FCoE-enabled networking device, that the second communication includes an Ethernet frame;
   forwarding, by the first non-FCoE-enabled networking device, the Ethernet frame using an L2 forwarding table.

16. The method of claim 14, wherein the determining that the first communication includes the first FCoE frame includes retrieving an ethertype from the first communication.

17. The method of claim 14, wherein the first standard IP frame location is a source Internet Protocol (IP) byte 3 field for an IP frame, the second standard IP frame location is a destination IP byte 0 field for the IP frame, and the third standard IP frame location is a destination IP byte 1 field for the IP frame.

18. The method of claim 14, wherein the first standard IP frame location in the first FCoE frame corresponds to an FC destination identifier (DID) domain field in the first FCoE frame, the second standard IP frame location in the first FCoE frame corresponds to an FC DID area field in the first FCoE frame, and the third standard IP frame location in the first FCoE frame corresponds to an FC DID port field in the first FCoE frame.

19. The method of claim 14, further comprising:
   receiving, by the first non-FCoE-enabled networking device, a third communication through the network;
   determining, by the first non-FCoE-enabled networking device, that the third communication includes a second FCoE frame;
   retrieving, by the first non-FCoE-enabled networking device, first data from the first standard IP frame location in the second FCoE frame;
   determining, by the first non-FCoE-enabled networking device, that the first data retrieved from the second FCoE frame is not associated with an L3 forwarding table included in the first non-FCoE-enabled networking device;
   determining, by the first non-FCoE-enabled networking device, a second non-FCoE-enabled networking device that includes an L3 forwarding table that is associated with the first data retrieved from the second FCoE frame; and
   forwarding, by the first non-FCoE-enabled networking device, the second FCoE frame to the second non-FCoE-enabled networking device through the network.

20. The method of claim 14, wherein the first non-FCoE-enabled networking device is configured to not check the validity of IP addresses in communications received through the network.

* * * * *